J. T. FREESTONE.
VAPORIZER.
APPLICATION FILED JAN. 27, 1913.

1,080,432.

Patented Dec. 2, 1913.

Witnesses
W. Williams
M. Myer

Inventor
J. T. Freestone
By
Atty.

UNITED STATES PATENT OFFICE.

JOSEPH THOMAS FREESTONE, OF LIVERPOOL, ENGLAND.

VAPORIZER.

1,080,432.  Specification of Letters Patent.  Patented Dec. 2, 1913.

Application filed January 27, 1913. Serial No. 744,547.

*To all whom it may concern:*

Be it known that I, JOSEPH THOMAS FREESTONE, a subject of the King of England, residing at Colonial House, Water street, Liverpool, in the county of Lancaster, England, have invented new and useful Improvements in Vaporizers, of which the following is a specification.

This invention has reference to apparatus for charging the atmosphere of rooms, or spaces, with substances which purify or sanitize, or aromatize it; and has for its object to provide an apparatus which is simple, inexpensive and effective. The sanitary substance to be vaporized is a solid block; and the apparatus consists of a part which is revolved or spun upon its axis by hand, having a knob, or like device which is grasped by the finger and thumb, and spun around; and the block fits on a spindle, carried in an openwork casing. By this apparatus a relative rotative movement between the air and the solid substance is produced, and the air in contact with the body takes it up or absorbs it in the form of a vapor; and this vapor charged air is thrown off by the spinning action effected by hand, and is diffused or distributed into and through the room or space within which the apparatus is placed and worked.

Figure 1:
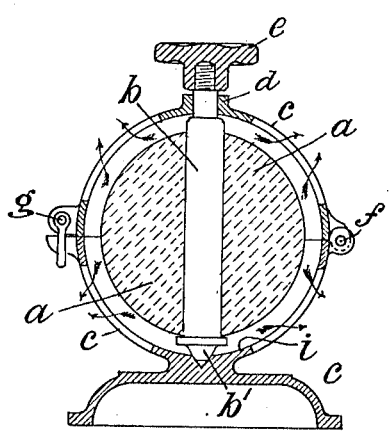
Figure 2:
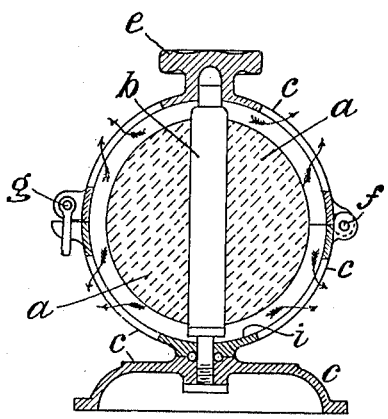

In the accompanying drawings, which illustrate the invention, Figure 1 is a sectional elevation of the apparatus; while Fig. 2 shows a slight modification.

Referring to Fig. 1, the sanitary solid substance $a$ is a sphere with a hole through it; and it is mounted on a suitably shaped spindle $b$, supported and within a cage $c$; the lower end of the spindle $b$ being a pivot $b^1$, fitting in a seat $i$; while the upper part revolves within a boss $d$ of the cage and has a milled head $e$ screwed on to it, by which it and the sphere of substance is revolved. The solid substance $a$ may comprise naphthalene and essential oils of wall-flower, bergamot, or the like. Oil of wall-flower above mentioned is a synthetic or artificial preparation of oil of wall-flower. The openwork cage $c$ is divided in the horizontal plane, the two halves being hinged together at $f$, and provided with a fastening at $g$ on the opposite side. The sphere $a$ is passed on to the spindle $b$ when the case or frame $c$ is opened, and it has been removed from the upper part of the case $c$, which can be done upon the removal of the rotating device $e$. After this the spindle $b$, with the sphere on it, is replaced, and the cage closed, whereupon it is ready for use. By the action of the air, and velocity of the body, it is found that the body is vaporized and used up in such a way that when it is nearly all gone, there will be some of the substance extending for nearly the whole length of the spindle $b$.

In the apparatus shown in Fig. 2, the substance $a$ is stationary upon its supporting spindle $b$, and the part $c$ which comes outside it is adapted to be revolved; and in action, by revolving it, by the finger and thumb in the manner above described, the air about the sphere $a$ will be moved over its surface, and will thereby take up the substance in the same manner as above described, and throw the vapor charged air off and distribute it.

What is claimed is:—

1. In a vaporizer, the combination of a cage having a plurality of openings, a base on which the cage is supported, a spindle extending from the base and to the top of the cage, the spindle adapted to receive a spherical solid block of vaporizing material, and a knob located above the cage and spindle, whereby a rotary motion may be imparted between the cage and the solid block of vaporizing material to agitate the air surrounding the vaporizing material to throw off the fumes from the latter through the openings in the cage.

2. In a vaporizer, the combination of a cage formed with a plurality of openings, a base for supporting the cage, a spindle mounted in the cage to receive a solid block of vaporizing material, and a knob on the upper end of the spindle to rotate the vaporizing material and agitate the air between the latter and the cage, whereby to throw the fumes through the openings in the cage.

3. In a vaporizer, the combination of a cage formed with openings, said cage comprising hinged sections, means for securing the two sections together, a spindle mounted to rotate in the cage and extending through the top of the latter, said spindle adapted to receive a solid block of vaporizing material, and a knob on the upper end of the spindle, whereby the solid block of vaporizing material may be rotated to agitate the air and throw off the fumes through the openings in the cage.

In testimony whereof I have signed my name to this specification in the presence of two subscribing witnesses.

JOSEPH THOMAS FREESTONE.

Witnesses:
 SOMERVILLE GOODALL,
 EDWARD HUGHES.

Copies of this patent may be obtained for five cents each, by addressing the "Commissioner of Patents, Washington, D. C."